United States Patent
Yang et al.

(10) Patent No.: US 10,764,413 B2
(45) Date of Patent: Sep. 1, 2020

(54) FRAME TRANSMISSION METHOD AND APPARATUS IN WIRELESS LOCAL AREA NETWORK

(71) Applicant: HUAWEI TECHNOLOGIES CO., LTD., Shenzhen, Guangdong (CN)

(72) Inventors: Xun Yang, Shenzhen (CN); Meilu Lin, Shenzhen (CN); Ming Gan, Shenzhen (CN); Le Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/019,295

(22) Filed: Jun. 26, 2018

(65) Prior Publication Data

US 2018/0309858 A1    Oct. 25, 2018

Related U.S. Application Data

(63) Continuation of application No. PCT/CN2016/104894, filed on Nov. 7, 2016.

(30) Foreign Application Priority Data

Dec. 31, 2015   (CN) .......................... 2015 1 1032182
Feb. 5, 2016    (CN) .......................... 2016 1 0082069

(51) Int. Cl.
*H04W 4/00*     (2018.01)
*H04L 29/08*    (2006.01)
(Continued)

(52) U.S. Cl.
CPC .......... *H04L 69/323* (2013.01); *H04L 5/0053* (2013.01); *H04W 28/06* (2013.01);
(Continued)

(58) Field of Classification Search
CPC ... H04L 5/0053; H04L 5/0091; H04L 69/323; H04L 69/329; H04W 28/06; H04W 72/0446; H04W 80/02; H04W 84/12
See application file for complete search history.

(56) References Cited

U.S. PATENT DOCUMENTS

2011/0249660 A1   10/2011   Noh et al.
2012/0327915 A1   12/2012   Kang et al.
(Continued)

FOREIGN PATENT DOCUMENTS

| CN | 102595494 A | 7/2012 |
| CN | 102652419 A | 8/2012 |
| CN | 104221443 A | 12/2014 |

OTHER PUBLICATIONS

Office Action issued in Chinese Application No. 201610082069.2 dated Jun. 4, 2019, 10 pages (With English translation).
(Continued)

*Primary Examiner* — Abdelnabi O Musa
(74) *Attorney, Agent, or Firm* — Fish & Richardson P.C.

(57) ABSTRACT

The frame transmission method in the wireless local area network includes: generating, by an access point, a physical layer protocol data unit PPDU of a target type, where the PPDU includes a target media access control MAC frame structure that is generated in a target encapsulation format and that carries a trigger frame, and whether the target MAC frame structure includes a packet extension field is determined based on the target type and the target encapsulation format; and sending, by the access point, the PPDU.

10 Claims, 12 Drawing Sheets

(51) Int. Cl.
*H04L 5/00* (2006.01)
*H04W 28/06* (2009.01)
*H04W 72/04* (2009.01)
*H04W 84/12* (2009.01)
*H04W 80/02* (2009.01)
*H04W 88/08* (2009.01)

(52) U.S. Cl.
CPC ....... *H04W 72/0446* (2013.01); *H04L 5/0023* (2013.01); *H04L 5/0091* (2013.01); *H04L 69/329* (2013.01); *H04L 2212/00* (2013.01); *H04W 80/02* (2013.01); *H04W 84/12* (2013.01); *H04W 88/08* (2013.01)

(56) References Cited

U.S. PATENT DOCUMENTS

| | | | |
|---|---|---|---|
| 2014/0036895 A1 | 2/2014 | Liu et al. | |
| 2016/0294515 A1* | 10/2016 | Wentink | H04L 5/005 |
| 2016/0330708 A1 | 11/2016 | Seok et al. | |
| 2016/0330714 A1* | 11/2016 | Hedayat | H04W 72/1289 |
| 2018/0317128 A1* | 11/2018 | Chun | H04B 7/26 |

OTHER PUBLICATIONS

IEEE 802.11-15/1033r0 Yongho Seok et al.,"Data field in He PPDU",NEWRACOM,dated Sep. 13, 2015,total 16 pages.
International Search Report issued in International Application No. PCT/CN2016/104894 dated Jan. 20, 2017, 9 pages.

\* cited by examiner

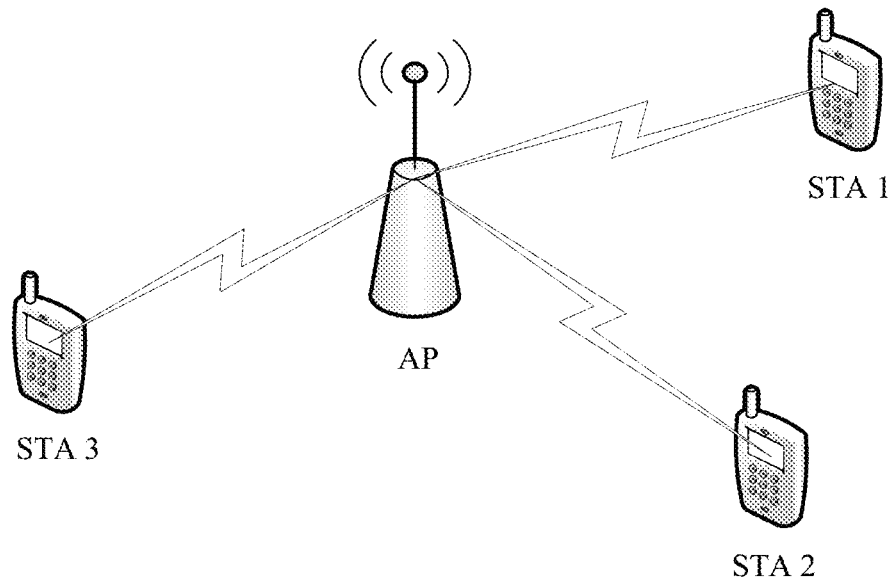

FIG. 1

An access point generates a physical layer protocol data unit PPDU of a target type, where the PPDU includes a target media access control MAC frame structure that is generated in a target encapsulation format and that carries a trigger frame, and whether the target MAC frame structure includes a packet extension field is determined based on the target type and the target encapsulation format — S100

The access point sends the PPDU — S101

FIG. 2

| Frame Control | Duration | (A1) | (A2) | Carried Frame Control | Carried Frame Length | Carried Frame | Padding | FCS2 |

FIG. 7

FRAME TRANSMISSION METHOD AND APPARATUS IN WIRELESS LOCAL AREA NETWORK

CROSS-REFERENCE TO RELATED APPLICATIONS

This application is a continuation of International Application No. PCT/CN2016/104894, filed on Nov. 7, 2016, which claims priority to Chinese Patent Application No. 201610082069.2, filed on Feb. 5, 2016 and Chinese Patent Application No. 201511032182.1, filed on Dec. 31, 2015. The disclosures of the aforementioned applications are hereby incorporated by reference in their entireties.

TECHNICAL FIELD

The present invention relates to the field of wireless technologies, and in particular, to a frame transmission method and apparatus in a wireless local area network.

BACKGROUND

An uplink multiple-input multiple-output (Multiple-Input Multiple-Output, MIMO) technology and an uplink orthogonal frequency division multiple access (Orthogonal Frequency Division Multiple Access, OFDMA) technology have been widely applied to wireless communication, and are used as key technologies for improving a capacity and a user quantity. When the technologies are applied to the 802.11 family of standards, an access point (Access Point, AP) needs to send a trigger frame (Trigger Frame) to instruct receiving stations (Station, STA) to synchronously send uplink data frames of the receiving stations after a particular time.

According to the 802.11 standards, the particular time described above is generally defined as a short interframe space (Short Interframe Space, SIFS). Within the SIFS, a receiving station needs to first parse trigger information carried in the trigger frame, and then transmits data based on the trigger information by using an uplink transmission resource. However, the receiving station cannot complete the foregoing steps within the SIFS time.

Some solutions are proposed to resolve the problem. One solution is to extend the SIFS time, so that the time is enough for the receiving station to complete the foregoing procedures. However, in the method, a wait time between adjacent frames is increased, and therefore there is a hidden transmission conflict risk. Another solution is that the information carried in the trigger frame is placed in physical layer signaling (PHY Signaling) for transmission, so that processing of the information by a receive end can be accelerated, and it is ensured that the receive end can complete processing within the SIFS time. However, the method requires that the receiving station has a special receiving state machine for the signaling, and consequently complexity of a receiver is increased. In addition, because of a limit of a quantity of bits, the physical layer signaling may not be enough to accommodate an information amount in this scale.

A more acceptable solution is a padding (padding) design at a media access control (Media Access Control, MAC) layer. That is, unwanted signals are added after wanted signaling. The unwanted signals are a packet extension field in a MAC frame structure. The AP sends the unwanted signals, so that the receiving station has enough time to parse the trigger information carried in the trigger frame and then transmit the data based on the trigger information by using the uplink transmission resource, and it is ensured that the wait time between the adjacent frames is still the SIFS. However, the design is applicable to only a physical layer protocol data unit (physical layer protocol data unit, PPDU) of a legacy (legacy) type, but is not applicable to a later version.

SUMMARY

Embodiments of the present invention provide a frame transmission method and apparatus in a wireless local area network, so that whether a target MAC frame structure includes a packet extension field may be determined based on a target type of a PPDU and a target encapsulation format of the target MAC frame structure that carries a trigger frame, so as to adapt to various versions of PPDUs.

According to a first aspect, an embodiment of the present invention provides a frame transmission method in a wireless local area network, and the method includes:

generating, by an access point, a physical layer protocol data unit PPDU of a target type, where the PPDU includes a target media access control MAC frame structure that is generated in a target encapsulation format and that carries a trigger frame, and whether the target MAC frame structure includes a packet extension field is determined based on the target type and the target encapsulation format; and sending, by the access point, the PPDU.

According to the first aspect, in a first feasible implementation of the first aspect, if the target type is a high efficiency HE PPDU, and the target encapsulation format is an AMPDU, the target MAC frame structure does not include the packet extension field; and the PPDU includes indication information that is used to indicate that the target MAC frame structure does not include the packet extension field, where the indication information includes a first termination location indicated by an effective trigger length field of the trigger frame and a second termination location indicated by an MPDU delimiter of the AMPDU, and the first termination location is the same as the second termination location.

According to the first aspect, in a second feasible implementation of the first aspect, the packet extension field includes at least one of a padding field or an FCS2 field;

if the target type is an HE PPDU, and the target encapsulation format is an MPDU, whether the target MAC frame structure includes the packet extension field is determined based on the HE PPDU type, the MPDU encapsulation format, and whether an effective length of the target MAC frame structure satisfies a preset condition, where the preset condition is that a termination location of the effective length of the target MAC frame structure is before a termination location of a length of the PPDU; and if the effective length of the target MAC frame structure satisfies the preset condition, the target MAC frame structure includes the packet extension field; or if the effective length of the target MAC frame structure does not satisfy the preset condition, the target MAC frame structure does not include the packet extension field.

According to the second feasible implementation of the first aspect, in a third feasible implementation of the first aspect, if the target MAC frame structure includes the packet extension field, the PPDU includes indication information that is used to indicate that the target MAC frame structure includes the packet extension field, where the indication information includes a third termination location indicated by an effective length field of the trigger frame and a fourth termination location indicated by a length field of the PPDU, and a byte difference between the fourth termination location and the third termination location is greater than a preset threshold; or if the target MAC frame structure does not include the packet extension field, the PPDU includes indication information that is used to indicate that the target MAC frame structure does not include the packet extension field, where the indication information includes a fifth termination location indicated by an effective length field of the trigger frame and a sixth termination location indicated by a length field of the PPDU, and a byte difference between the sixth termination location and the fifth termination location is less than or equal to a preset threshold.

According to the second feasible implementation of the first aspect, in a fourth feasible implementation of the first aspect, if the target MAC frame structure includes the packet extension field, the PPDU includes indication information that is used to indicate that the target MAC frame structure includes the packet extension field, where the indication information includes a length value that is encapsulated in an effective length field of the trigger frame and that falls within a preset range; or if the target MAC frame structure does not include the packet extension field, the PPDU includes indication information that is used to indicate that the target MAC frame structure does not include the packet extension field, where the indication information includes a length value that is encapsulated in an effective length field of the trigger frame and that exceeds a preset range.

According to the first aspect, in a fifth feasible implementation of the first aspect, if the target type is a very high throughput VHT PPDU, and the target encapsulation format is an AMPDU, the target MAC frame structure includes the packet extension field; and the PPDU includes indication information that is used to indicate that the target MAC frame structure includes the packet extension field, where the indication information includes a seventh termination location indicated by an effective trigger length field of the trigger frame and an eighth termination location indicated by an MPDU delimiter of the AMPDU, and the seventh termination location is different from the eighth termination location.

A second aspect of the present invention provides a frame transmission apparatus in a wireless local area network, and the apparatus includes:

a baseband circuit, configured to generate a physical layer protocol data unit PPDU of a target type, where the PPDU includes a target media access control MAC frame structure that is generated in a target encapsulation format and that carries a trigger frame, and whether the target MAC frame structure includes a packet extension field is determined based on the target type and the target encapsulation format; and a radio frequency circuit, configured to send the PPDU.

According to the second aspect, in a first feasible implementation of the second aspect, if the target type is a high efficiency HE PPDU, and the target encapsulation format is an AMPDU, the target MAC frame structure does not include the packet extension field; and the PPDU includes indication information that is used to indicate that the target MAC frame structure does not include the packet extension field, where the indication information includes a first termination location indicated by an effective trigger length field of the trigger frame and a second termination location indicated by an MPDU delimiter of the AMPDU, and the first termination location is the same as the second termination location.

According to the second aspect, in a second feasible implementation of the second aspect, the packet extension field includes at least one of a padding field or an FCS2 field;

if the target type is an HE PPDU, and the target encapsulation format is an MPDU, whether the target MAC frame structure includes the packet extension field is determined based on the HE PPDU type, the MPDU encapsulation format, and whether an effective length of the target MAC frame structure satisfies a preset condition, where the preset condition is that a termination location of the effective length of the target MAC frame structure is before a termination location of a length of the PPDU; and if the effective length of the target MAC frame structure satisfies the preset condition, the target MAC frame structure includes the packet extension field; or if the effective length of the target MAC frame structure does not satisfy the preset condition, the target MAC frame structure does not include the packet extension field.

According to the second feasible implementation of the second aspect, in a third feasible implementation of the second aspect, if the target MAC frame structure includes the packet extension field, the PPDU includes indication information that is used to indicate that the target MAC frame structure includes the packet extension field, where the indication information includes a third termination location indicated by an effective length field of the trigger frame and a fourth termination location indicated by a length field of the PPDU, and a byte difference between the fourth termination location and the third termination location is greater than a preset threshold; or if the target MAC frame structure does not include the packet extension field, the PPDU includes indication information that is used to indicate that the target MAC frame structure does not include the packet extension field, where the indication information includes a fifth termination location indicated by an effective length field of the trigger frame and a sixth termination location indicated by a length field of the PPDU, and a byte difference between the sixth termination location and the fifth termination location is less than or equal to a preset threshold.

According to the second feasible implementation of the second aspect, in a fourth feasible implementation of the second aspect, if the target MAC frame structure includes the packet extension field, the PPDU includes indication information that is used to indicate that the target MAC frame structure includes the packet extension field, where the indication information includes a length value that is encapsulated in an effective length field of the trigger frame and that falls within a preset range; or if the target MAC frame structure does not include the packet extension field, the PPDU includes indication information that is used to indicate that the target MAC frame structure does not include the packet extension field, where the indication information includes a length value that is encapsulated in an effective length field of the trigger frame and that exceeds a preset range.

According to the second aspect, in a fifth feasible implementation of the second aspect, if the target type is a very high throughput VHT PPDU, and the target encapsulation format is an AMPDU, the target MAC frame structure includes the packet extension field; and the PPDU includes indication information that is used to indicate that the target MAC frame structure includes the packet extension field, where the indication information includes a seventh termination location indicated by an effective trigger length field of the trigger frame and an eighth termination location indicated by an MPDU delimiter of the AMPDU, and the seventh termination location is different from the eighth termination location.

In the embodiments of the present invention, the access point generates the PPDU of the target type, where the PPDU includes the target MAC frame structure that is generated in the target encapsulation format and that carries the trigger frame, and whether the target MAC frame structure includes the packet extension field is determined based on the target type and the target encapsulation format. In the embodiments, whether the target MAC frame structure includes the packet extension field is determined based on the target type of the PPDU and the target encapsulation format of the target MAC frame structure that carries the trigger frame, so as to adapt to various versions of PPDUs.

BRIEF DESCRIPTION OF DRAWINGS

FIG. 1 is a diagram of an application scenario according to the present invention;

FIG. 2 is a schematic flowchart of a frame transmission method in a wireless local area network according to an embodiment of the present invention;

FIG. 7 is a schematic diagram of a general MAC frame structure according to an embodiment of the present invention;

DESCRIPTION OF EMBODIMENTS

Figure 3:
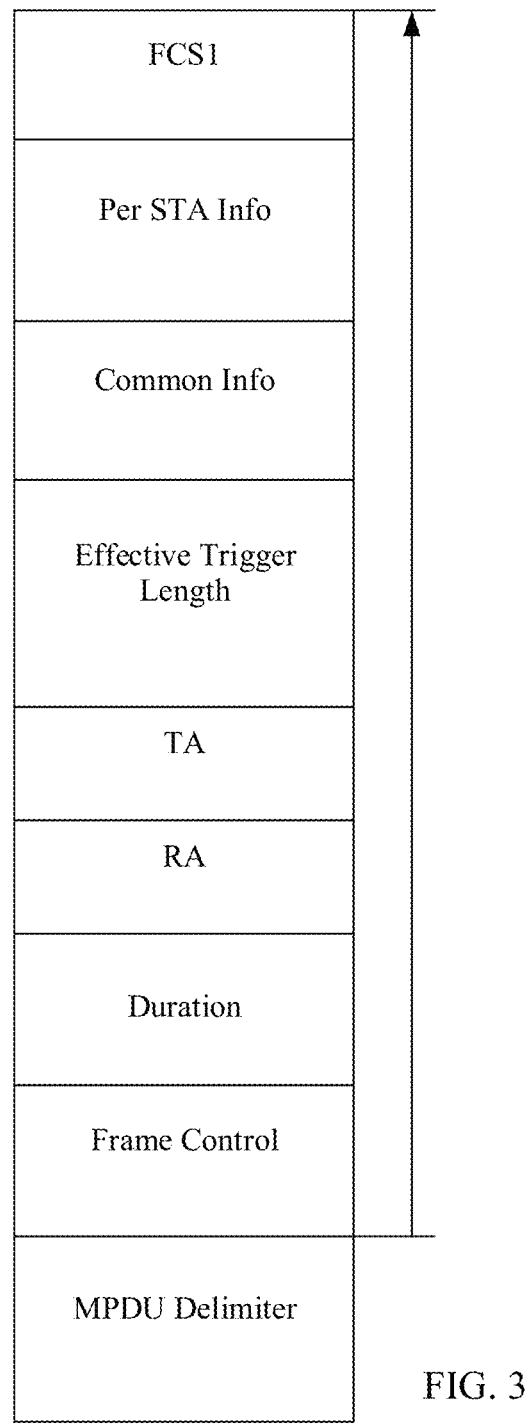
FIG. 3 is a schematic structural diagram of a PPDU according to an embodiment of the present invention.

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The embodiments of the present invention may be applied to a wireless local area network (Wireless Local Area Network, WLAN). Currently, a standard used in the WLAN is the Institute of Electrical and Electronics Engineers (English: Institute of Electrical and Electronics Engineers, IEEE) 802.11 family. The WLAN may include a plurality of basic service sets (Basic Service Set, BSS). A network node in the basic service set is a station. The station includes an access point (Access Point, AP) and a non-access point station (Non-Access Point Station, Non-AP STA). Each basic service set may include one AP and a plurality of non-AP STAs associated with the AP. In the embodiments of the present invention, all non-AP STAs are collectively referred to as STAs.

The access point is also referred to as a wireless access point, a hotspot, or the like. An AP is an access point by using which a mobile user enters a wired network. The AP is mainly deployed in home, inside a building, and inside a park with a typical coverage radius of tens to hundreds of meters, and certainly may also be deployed outdoors. The AP is equivalent to a bridge connecting a wired network and a wireless network. A main function of the AP is to connect wireless network clients, and then connect the wireless network and an Ethernet network. Specifically, the AP may be a terminal device or a network device with a Wireless Fidelity (Wireless Fidelity, WiFi) chip. Optionally, the AP may be a device supporting a plurality of WLAN standards such as 802.11ax, 802.11ac, 802.11n, 802.11g, 802.11b, and 802.11a. It should be noted that in different standards, types of PPDUs (PHY protocol data unit, physical layer protocol data unit) sent by the AP are different, that is, encapsulation manners of the PPDUs are different.

The non-access point station may be a wireless communications chip, a wireless sensor, or a wireless communications terminal, for example, may be a mobile phone that supports a WiFi communication function, a tablet computer that supports a WiFi communication function, a set top box that supports a WiFi communication function, a smart TV that supports a WiFi communication function, an intelligent wearable device that supports a WiFi communication function, an in-vehicle communications device that supports a WiFi communication function, and a computer that supports a WiFi communication function. Optionally, the station may be a device supporting a plurality of WLAN standards such as 802.11ax, 802.11ac, 802.11n, 802.11g, 802.11b, and 802.11a.

FIG. 1 is a schematic diagram of a system in a typical WLAN deployment scenario. The system includes one AP and three STAs. The AP communicates with a STA 1, a STA 2, and a STA 3.

In a WLAN system to which an OFDMA technology and a MIMO technology are introduced, the AP may perform uplink and downlink transmission with different STAs on different time-frequency resources. The AP may use different modes to perform uplink and downlink transmission, for example, an OFDMA single-user multiple-input multiple-output (Single-User Multiple-Input Multiple-Output, SU-MIMO for short) mode or an OFDMA multi-user multiple-input multiple-output (Multi-User Multiple-Input Multiple-Output, MU-MIMO for short) mode.

When performing uplink and downlink transmission with a plurality of STAs, the AP needs to perform resource indication for each scheduled STA. In this embodiment, the AP sends a trigger frame to each STA to provide resource indication information, so that an STA can know whether the STA is scheduled, where an allocated uplink transmission resource is, what parameter should be used for transmission, how long the transmission is, and the like. All these pieces of information may be indicated by using trigger information in the trigger frame.

Further, the AP encapsulates the trigger frame in a MAC frame structure, encapsulates the MAC frame structure at a physical layer by using PPDUs of different types, and sends the MAC frame structure. Because encapsulation manners in the PPDUs of different types are different, when the trigger frame is encapsulated at a MAC layer, a target MAC frame structure that carries the trigger frame may include a packet extension (Packet Extension) field, or may not include a packet extension field, but it needs to be ensured, in either case, that a receiving station has enough time to parse the trigger information in the trigger frame. Whether the target MAC frame structure includes the packet extension field is determined mainly based on a target type of a PPDU and a target encapsulation format of the target MAC frame structure. For example, if a target type of a high efficiency physical layer protocol data unit (High Efficiency PPDU, HE PPDU) and a target encapsulation format of an aggregated media access control layer protocol data unit (Aggregated Media Protocol Data Unit, AMPDU) are used, because the HE PPDU involves packet extension at a physical layer, the receiving station can have enough time to parse the trigger information in the trigger frame without a need of encapsulating a packet extension field in the target MAC frame structure.

Specifically, the PPDU sent by the AP includes a Physical Layer Convergence Protocol (Physical Layer Convergence Protocol, PLCP for short) header (Header) domain and a data domain. The PLCP header includes a legacy preamble (L-Preamble) part and a high efficiency preamble part. The high efficiency preamble part includes a high efficiency signaling A (High Efficient signaling A, HE-SIGA for short) part and a high efficiency signaling B (High Efficient signaling B, HE-SIGB for short) part. The PPDU may further include a media access control (Media Access Control, MAC for short) layer part, that is, the target MAC frame structure. The target MAC frame structure may be encapsulated in an MPDU encapsulation format, or may be encapsulated in an AMPDU encapsulation format.

Referring to FIG. 2, FIG. 2 is a flowchart of a frame transmission method in a wireless local area network according to an embodiment of the present invention. The method may be applied to an access point, for example, the AP in FIG. 1, and the access point may support a plurality of WLAN standards. FIG. 2 is a flowchart of frame transmission in a wireless local area network. Specific steps are as follows:

S100. The access point generates a physical layer protocol data unit PPDU of a target type, where the PPDU includes a target media access control MAC frame structure that is generated in a target encapsulation format and that carries a trigger frame, and whether the target MAC frame structure includes a packet extension field is determined based on the target type and the target encapsulation format.

In this embodiment of the present invention, the AP generates the PPDU of the target type. It should be noted that in different standards, types of PPDUs generated by the AP are different. Optionally, the target type may be an HE PPDU, or the target type may be a high throughput PPDU (High Throughput PPDU, HT PPDU), or the target type may be a very high throughput PPDU (Very High Throughput PPDU, VHT PPDU). It should be noted that the target type is not limited in this embodiment, and the type mentioned above is merely an example.

Further, the PPDU includes the target MAC frame structure that is generated in the target encapsulation format and that carries the trigger frame. The target MAC frame structure is a structure encapsulated at a MAC layer. It should be noted that the target encapsulation format is used when the trigger frame is encapsulated at the MAC layer. Optionally, the target encapsulation format may be an AMPDU format, or may be an MPDU format, and is not limited herein.

Specifically and optionally, the trigger frame carried in the target MAC frame structure includes trigger information, and the trigger information is used to indicate an uplink transmission resource for each station. Generally, the target MAC frame structure may carry a packet extension field to enable each station to have enough time to parse the trigger information. That is, unwanted signals are added after wanted signaling. The unwanted signals are sent, so that a receiver can have enough time to parse the trigger information carried in the trigger frame.

Because the target MAC frame structure is encapsulated at a physical layer in different types of PPDUs, and target encapsulation formats used to encapsulate the trigger frame at the MAC layer may also be different, the purpose that the receiver has enough parsing time cannot be achieved only in the manner of encapsulating the packet extension field at the MAC layer. For example, in an encapsulation process of a PPDU of another type, the PPDU involves packet extension at a physical layer, and a target encapsulation format does not allow additional packet extension at a MAC layer. In this case, packet extension is not required at the MAC layer.

The following uses several optional target types and target encapsulation formats as examples to describe encapsulation manners and indication solutions of the trigger frame for PPDUs of various types.

Optionally, if the target type is the HE PPDU, and the target MAC frame structure carrying the trigger frame is encapsulated in the AMPDU target encapsulation format, because the HE PPDU has a packet extension function when being encapsulated at the physical layer, and the AMPDU target encapsulation format does not have a packet extension function, the target MAC frame structure does not include the packet extension field of the trigger frame. However, because packet extension is involved at the physical layer, a receiving station still has enough time to parse the trigger information.

As shown in FIG. 3, FIG. 3 shows an encapsulated structure of an MPDU in the AMPDU encapsulation format according to an embodiment of the present invention. As shown in the figure, the MPDU structure includes an effective trigger length field and an MPDU delimiter (Delimiter) field. The effective trigger length field is used to encapsulate an effective trigger length of the trigger frame. A termination location indicated by the effective trigger length field is a first frame check sequence (Frame Check Sequence, FCS1) field. Because the target MAC frame structure does not have a packet extension field, a termination location indicated by an MPDU length (MPDU Length) encapsulated by the MPDU delimiter is also the FCS1. That is, a first termination location indicated by the effective trigger length field is the same as a second termination location indicated by the MPDU delimiter of the AMPDU.

The receiving station STA reads the MPDU length in the MPDU delimiter, then reads a frame control field to learn that an MPDU following the MPDU delimiter is the trigger frame, and further reads the effective trigger length (Effective Trigger Length). The STA compares the MPDU length with the effective trigger length, and if the MPDU length and the effective trigger length terminate at the same location, the trigger frame includes no packet extension field. It may be understood that the receiving station STA may also determine, according to a standard, whether the PPDU is the HE PPDU and whether the encapsulation format at the MAC layer is the AMPDU, and if yes, determine that the trigger frame includes no packet extension field.

The MPDU structure in the AMPDU encapsulation format shown in FIG. 3 further includes another implementation. The trigger frame has only one FCS, the termination location indicated by the effective trigger length field is an end location of per station trigger information, and the termination location indicated by the MPDU length encapsulated by the MPDU delimiter is the FCS. In this case, there is a difference of one FCS between the first termination location indicated by the effective trigger length field and the second termination location indicated by the MPDU delimiter of the AMPDU, and the difference is usually 4 bytes.

It should be noted that a length indicated by the MPDU delimiter is from a start location of the frame control (Frame Control) field to an end location of the frame check field (FCS), and therefore the termination location indicated by the MPDU delimiter is the end location of the frame check field (FCS). A length indicated by the effective trigger length field is from a start location of a common trigger information (common info) field to an end location of the per station trigger information (Per STA Info) field, and therefore the termination location indicated by the effective trigger length field is the end location of the per station trigger information (Per STA Info) field.

The receiving station STA reads the MPDU length in the MPDU delimiter, then reads a frame control field to learn that an MPDU following the MPDU delimiter is the trigger frame, and further reads the effective trigger length (Effective Trigger Length). The STA compares the MPDU length with the effective trigger length, and if a difference between termination locations of the MPDU length and the effective trigger length is one FCS (usually 4 bytes), the trigger frame includes no packet extension field. It may be understood that the receiving station STA may also determine, according to a standard, whether the PPDU is the HE PPDU and whether the encapsulation format at the MAC layer is the AMPDU, and if yes, determine that the trigger frame includes no packet extension field.

Figure 4:
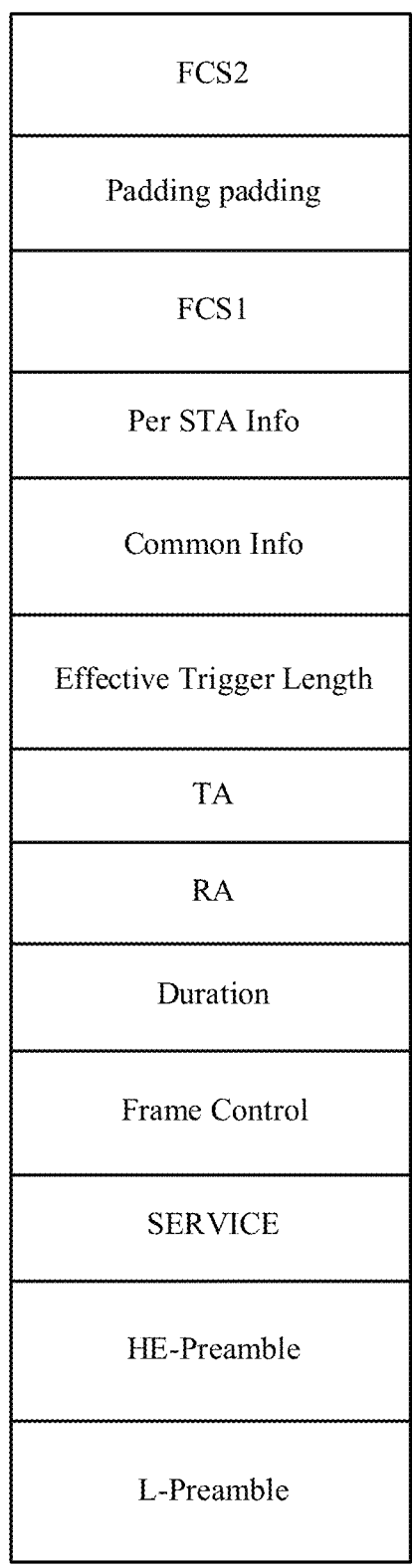
FIG. 4 is a schematic structural diagram of another PPDU according to an embodiment of the present invention.

Optionally, if the target type is the HE PPDU, and the target encapsulation format is the MPDU, that is, if the AP encapsulates the target MAC frame structure that carries the trigger frame in the HE PPDU at the physical layer, and the HE PPDU uses the MPDU target encapsulation format at the MAC layer, whether the target MAC frame structure includes a packet extension field needs to be further determined based on whether an effective length of the target MAC frame structure satisfies a preset condition. The preset condition is that a termination location of the effective length of the target MAC frame structure is before a termination location of a length of the PPDU. Generally, when the MPDU encapsulation format is used, if the termination location of the effective length of the MAC frame is before the termination location of the length of the PPDU, padding is required. That is, there is a packet extension function at the MAC layer. Because the MPDU encapsulation format is used, there is no MPDU delimiter, and no MPDU delimiter can be used for padding. A general padding manner is that padding (Padding) at the MAC layer is performed after the FCS1 by using a padding field and/or an FCS2 field. The padding field and/or the FCS2 field are/is referred to as a packet extension field. As shown in FIG. 4, FIG. 4 is a schematic structural diagram of an HE PPDU according to an embodiment of the present invention. A target MAC frame structure of the PPDU uses an MPDU encapsulation format. As shown in the figure, an L-SIG length field in an L-Preamble of the PPDU is used to indicate a length of the PPDU, and an effective trigger length field of a trigger frame is used to indicate an effective length of the trigger frame. A termination location indicated by an effective length in the effective trigger length field is the FCS1, and a termination location indicated by the PPDU length in the length field of the PPDU is the FCS2. It should be noted that if a packet extension field includes only padding, the termination location indicated by the PPDU length is the padding. If no packet extension field is included, the termination location indicated by the PPDU length is the FCS1. Therefore, it should be determined based on a specific case.

In an optional implementation, on the basis that the target type is the HE PPDU and the target encapsulation format is the MPDU, if the target MAC frame structure includes the packet extension field, the PPDU includes indication information that is used to indicate that the target MAC frame structure includes the packet extension field, where the indication information includes a third termination location indicated by an effective length field of the trigger frame and a fourth termination location indicated by a length field of the PPDU, and a byte difference between the fourth termination location and the third termination location is greater than a preset threshold.

If the target MAC frame structure does not include the packet extension field, the PPDU includes indication information that is used to indicate that the target MAC frame structure does not include the packet extension field, where the indication information includes a fifth termination location indicated by an effective length field of the trigger frame and a sixth termination location indicated by a length field of the PPDU, and a byte difference between the sixth termination location and the fifth termination location is less than or equal to a preset threshold.

The receiving station STA may determine, based on a byte difference between the termination location indicated by the L-SIG length field (L-Length) of the HE PPDU and the termination location indicated by the effective trigger length field of the trigger frame, whether the trigger frame includes a packet extension field.

Specifically, that the preset threshold is 0 is used as an example. If the termination locations of the L-Length and the effective trigger length field of the trigger frame are the same, that is, the FCS1, the trigger frame has no padding field or FCS2 field. If a difference between the termination locations of the L-Length and the effective trigger length field of the trigger frame is less than 4 bytes, the trigger frame includes a padding field, but includes no FCS2 field. If a difference between the termination locations of the L-Length and the effective trigger length field of the trigger frame is equal to 4 bytes, the trigger frame includes a padding field or FCS2 field of 4 bytes. If a difference between the termination locations of the L-Length and the effective trigger length field of the trigger frame is greater than 4 bytes, the trigger frame includes both a padding field and an FCS2 field.

The preset threshold may also be another value, such as 1 byte, 2 bytes, or a few bits, which is not limited in the present invention.

Figure 4A:
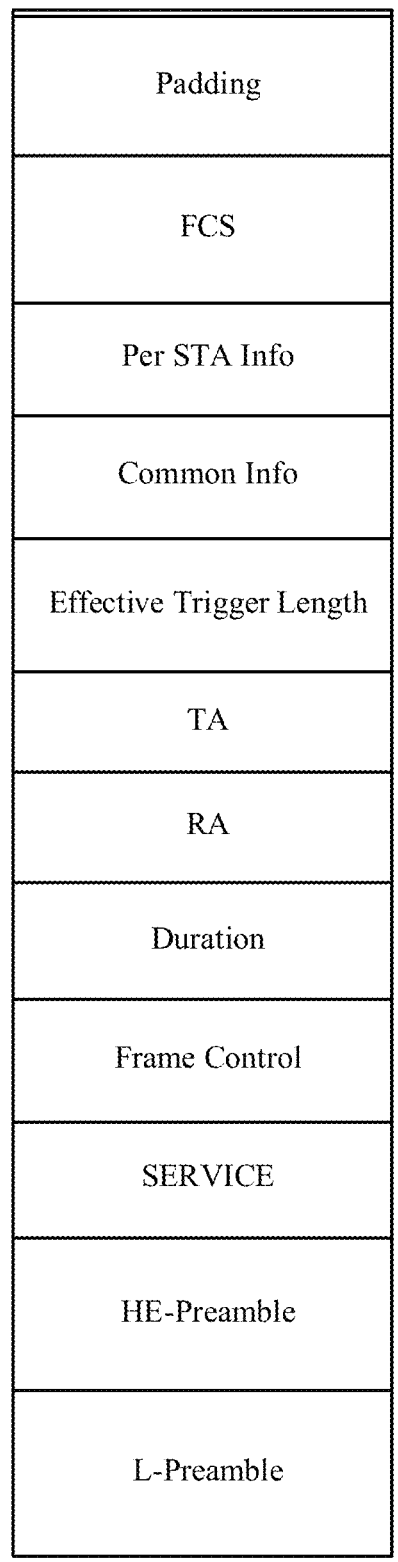
FIG. 4a is a schematic structural diagram of a PPDU according to an embodiment of the present invention.

FIG. 4a is a schematic structural diagram of an HE PPDU. A target MAC frame structure of the PPDU uses an MPDU encapsulation format. A trigger frame shown in FIG. 4a includes only one FCS field, a termination location indicated by an L-SIG length field (L-Length) is an end location of padding (padding), and a termination location indicated by an effective trigger length (Effective Trigger Length) field of the trigger frame is an end location of a per station trigger information (Per STA Info) field.

In this case, the preset threshold may be defined as an FCS length. If a difference between the termination locations of the L-Length and the effective trigger length field of the trigger frame is a length of one FCS (for example, 4 bytes), the trigger frame has no padding field. If a difference between the termination locations of the L-Length and the effective trigger length field of the trigger frame is greater than 4 bytes, the trigger frame has the padding field.

In another optional implementation, on the basis that the target type is the HE PPDU and the target encapsulation format is the MPDU, if the target MAC frame structure includes the packet extension field, the PPDU includes indication information that is used to indicate that the target MAC frame structure includes the packet extension field. The indication information includes a length value that is encapsulated in an effective length field of the trigger frame and that falls within a preset range.

If the target MAC frame structure does not include the packet extension field, the PPDU includes indication information that is used to indicate that the target MAC frame structure does not include the packet extension field. The indication information includes a length value that is encapsulated in an effective length field of the trigger frame and that exceeds a preset range. Optionally, the length value that exceeds the preset range may exceed an MPDU length stipulated in a current protocol or a maximum receiving or sending MPDU length notified during capability interaction.

The receiving station STA parses the effective length field of the trigger frame. If the effective length field of the trigger frame indicates a special length, for example, a value exceeding the MPDU length stipulated in the current protocol or the maximum receiving or sending MPDU length notified during capability interaction, the trigger frame does not have the packet extension field. Otherwise, the trigger frame includes the packet extension field.

Optionally, if the target type is the VHT PPDU, and the target encapsulation format is the AMPDU, the AP uses the VHT type to encapsulate, at the physical layer, the target MAC frame structure that carries the trigger frame. The AMPDU is certainly selected for the VHT format. However, the VHT format does not have a packet extension (Packet Extension) function at the physical layer. In addition, the AMPDU target encapsulation format is used at the MAC layer, and therefore there is no packet extension function at the MAC layer either. To enable the receiving station to have enough time to parse the trigger information, a packet extension field (the padding field and the FCS2 field) of the trigger frame needs to be reserved, and the packet extension field of the trigger frame is used as the packet extension field of the target MAC frame structure.

Figure 6:
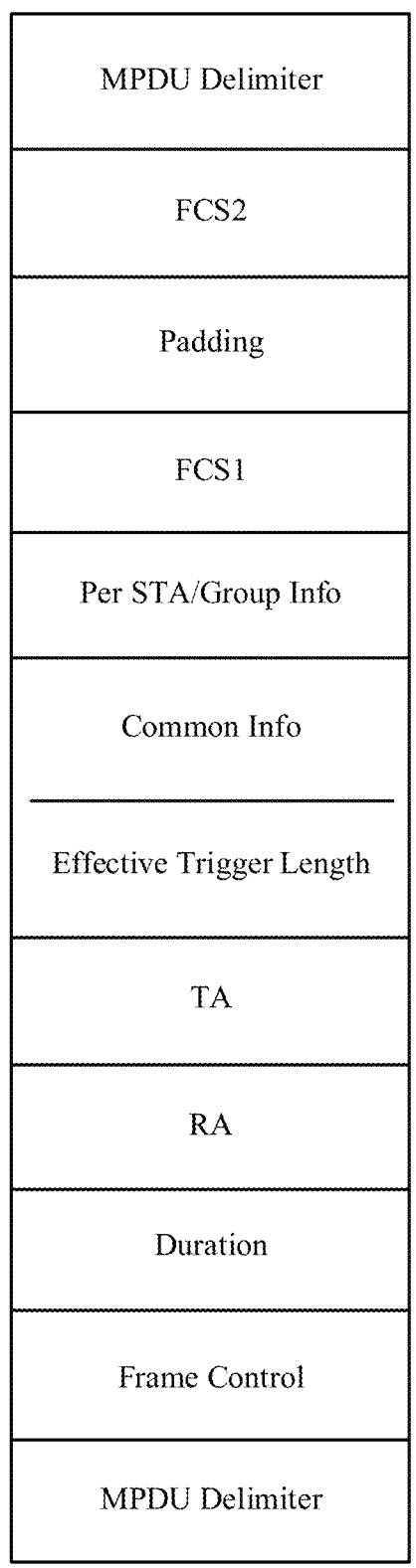
FIG. 6 is a schematic structural diagram of still another PPDU according to an embodiment of the present invention.

In addition, a format of the VHT PPDU at the MAC layer is the AMPDU, and therefore to align with a length of a data frame of another user at the MAC layer (if the VHT PPDU is an MU PPDU), the MPDU delimiter is used for alignment, that is, end of frame (end of frame, EOF) padding. As shown in FIG. 6, FIG. 6 is a schematic diagram of a frame structure of an MPDU in an AMPDU encapsulation format according to an embodiment of the present invention. As shown in the figure, the frame structure includes a packet extension field (a padding field and an FCS2 field) and an MPDU delimiter.

However, for that the receiving station parses the trigger information of the trigger frame, the packet extension field and the EOF padding need to satisfy a constraint condition that t (the padding field)+t (the FCS2 field)+t (the EOF padding)≥a time of reaction made by the receive end. t (x) refers to a transmission time of the field x. Generally, a typical value of the time of reaction made by the receive end is 16 µs, or the time may be another value such as 32 µs. This depends on a data processing capability of the receive end, and the time of reaction made by the receive end is not limited in the present invention.

The PPDU includes indication information that is used to indicate that the target MAC frame structure includes the packet extension field. The indication information includes a seventh termination location indicated by an effective trigger length field of a trigger frame and an eighth termination location indicated by an MPDU delimiter of the AMPDU, and the seventh termination location is different from the eighth termination location. The seventh termination location indicated by the effective trigger length field is the FCS1, and the eighth termination location is the FCS2.

The receiving station STA compares the termination location indicated by an MPDU length field of the MPDU delimiter of the VHT PPDU with the termination location indicated by the effective trigger length field of the trigger frame, to learn whether the trigger frame includes the padding field and the FCS2 field.

Figure 6A:
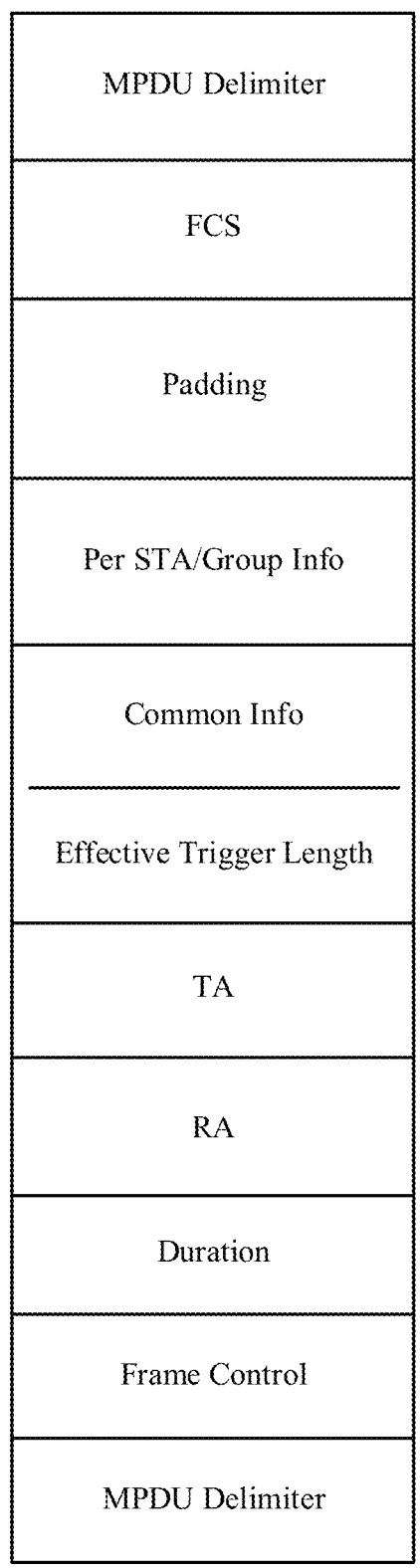
FIG. 6a is a schematic structural diagram of a PPDU according to an embodiment of the present invention.

FIG. 6a is a diagram of a target MAC frame structure in the VHT PPDU. The target MAC frame structure uses an AMPDU format, and therefore the target MAC frame structure includes a plurality of MPDUs. Different MPDUs are separated by an MPDU delimiter. The target MAC frame structure has only one FCS.

The VHT PPDU includes indication information that is used to indicate that the target MAC frame structure includes a packet extension field. The indication information includes a seventh termination location indicated by an effective trigger length field of the trigger frame and an eighth termination location indicated by an MPDU delimiter of the AMPDU, and the seventh termination location is different from the eighth termination location. The seventh termination location indicated by the effective trigger length field is a per station (Per STA/Group info) field, and the eighth termination location is the FCS.

The receiving station STA compares the termination location indicated by an MPDU length field of the MPDU delimiter of the VHT PPDU with the termination location indicated by the effective trigger length field of the trigger frame, to learn whether the trigger frame includes the padding field.

Figure 5:
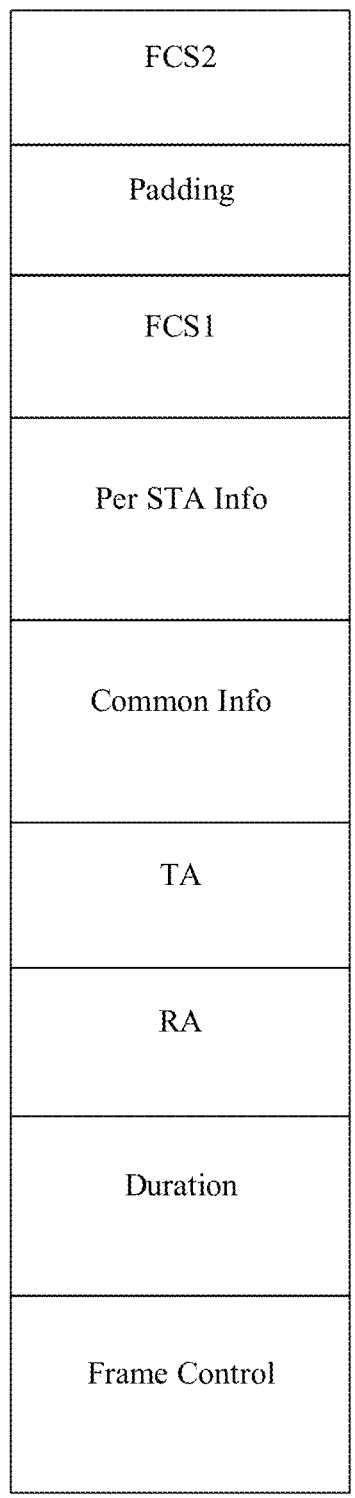
FIG. 5 is a schematic diagram of a target MAC frame structure according to an embodiment of the present invention.

Optionally, as shown in FIG. 5, FIG. 5 is a schematic diagram of another frame structure according to an embodiment of the present invention. As shown in the figure, the trigger frame does not have an effective trigger length (Effective Trigger Length) field. Instead, a time length required for sending the padding field and the FCS2 field is fixedly set to the time of reaction made by the receive end, for example, 16 µs. In this way, when the trigger frame is transmitted, only one information bit (a packet extension information bit) is required to indicate whether there is the padding field and the FCS2 field (for example, in a legacy PPDU or a high throughput HT PPDU, the information bit indicates that there is the padding field and the FCS2 field; and in an HE PPDU with an AMPDU format, the information bit indicates that there is no padding field or FCS2 field). The information bit usually requires only one bit. Optionally, the information bit may be located at a Common Info field, but is not limited to the Common Info field.

Further, the information bit may have a plurality of bits, for example, two bits. In this case, the information bit may indicate four cases for the transmission time length of the padding field and the FCS2 field that are following the information bit. That the time of reaction made by the receive end is 16 μs is used as an example, and the four cases may be specifically 0*16 ns, ⅓*16 μs, ⅔*16 μs, and 1*16 μs. 0 indicates that there is no padding field or FCS2 field. If the information bit includes three bits, the information bit may indicate eight time lengths. A quantity of used bits is not limited herein.

The receiving station STA reads the packet extension information bit of the trigger frame. If the packet extension information bit indicates that there is no packet extension field following the FCS1, the STA learns there is no packet extension field following the FCS1. If the packet extension information bit indicates that there is a packet extension field following the FCS1, the STA learns there is the packet extension field following the FCS1.

Figure 5A:
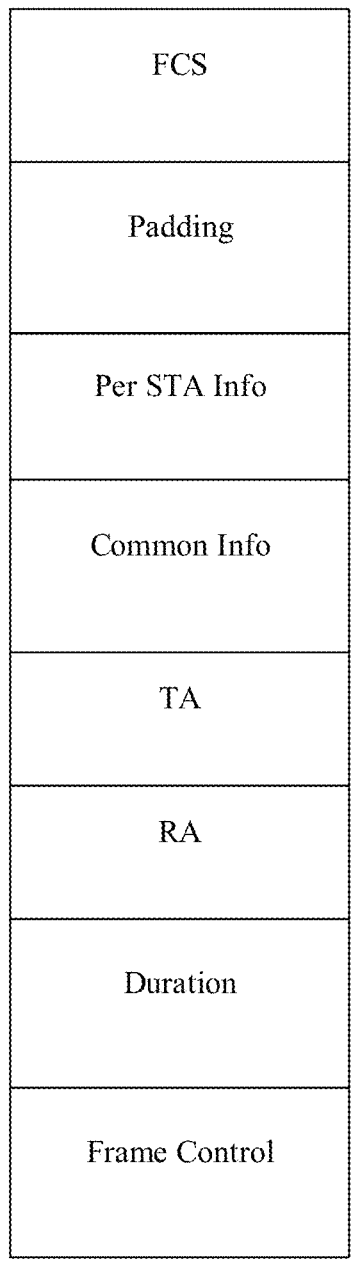
FIG. 5a is a schematic diagram of a target MAC frame structure according to an embodiment of the present invention.

It is assumed that the trigger frame is a structure shown in FIG. 5a, the trigger frame does not have an effective trigger length (Effective Trigger Length) field, and the trigger frame has only one FCS. Instead, a time length required for sending the padding field and the FCS field is fixedly set to the time of reaction made by the receive end, for example, 16 μs. In this way, when the trigger frame is transmitted, only one information bit (a packet extension information bit) is required to indicate whether there is the padding field (for example, in a legacy PPDU or a high throughput HT PPDU, the information bit indicates that there is the padding field; and in an HE PPDU with an AMPDU format, the information bit indicates that there is no padding field). The indication bit usually requires only one bit. Optionally, the information bit may be located at a Common Info field, but is not limited to the Common Info field.

Further, the information bit may have a plurality of bits, for example, two bits. In this case, the information bit may indicate four cases for the transmission time length of the padding field and the FCS field that are following the information bit. That the time of reaction made by the receive end is 16 μs is used as an example, and the four cases may be specifically 0*16 μs, ⅓*16 μs, ⅔*16 μs, and 1*16 μs. 0 indicates that there is no padding field or FCS field. If the information bit includes three bits, the information bit may indicate eight time lengths. A quantity of used bits is not limited herein.

The receiving station STA reads the packet extension information bit of the trigger frame. If the packet extension information bit indicates that there is no packet extension field following the per station trigger information (Per STA Info) field, the STA learns there is no packet extension field following the per station trigger information (Per STA Info) field. If the packet extension information bit indicates that there is a packet extension field following the per station trigger information (Per STA Info) field, the STA learns there is the packet extension field following the per station trigger information (Per STA Info) field.

Optionally, as shown in FIG. 7, FIG. 7 shows a more common frame format that carries a trigger frame and supports padding. The frame format is named as padding wrapper (padding wrapper). The format is an encapsulation format used in packet extension (Packet Extension), and may be used in packet extension of any frame, and in particular, in packet extension when a legacy PPDU is used to carry the trigger frame. It should be noted that the any frame may be disposed in a carried frame field.

A1 is a receive end address of the frame, and A2 is a transmit end address of the frame. A carried frame length field following carried frame control indicates a length of a frame carried by the carried frame field.

Figure 8:
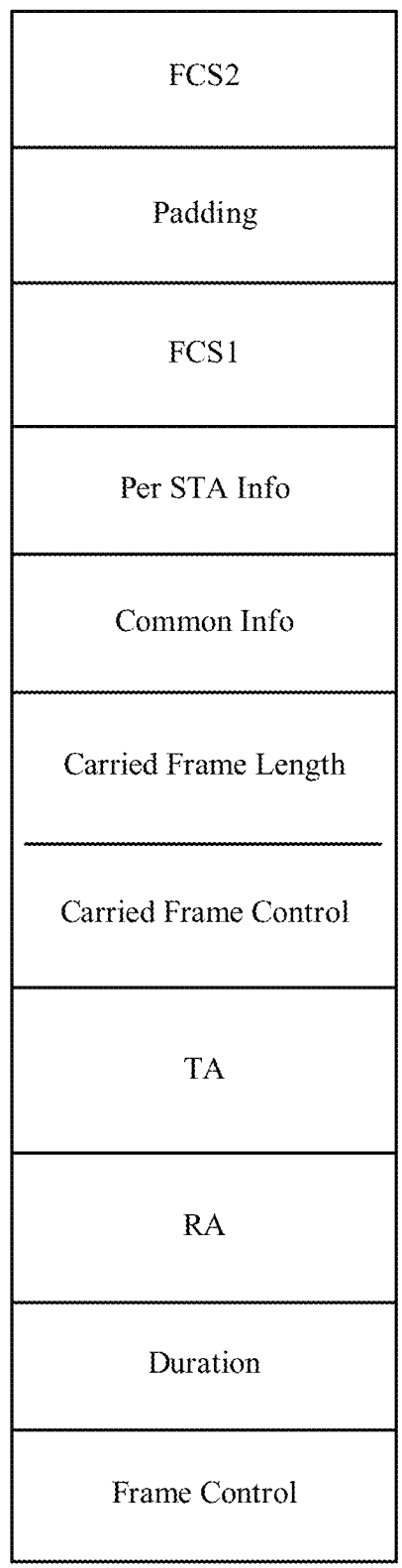
FIG. 8 is a schematic structural diagram of a general PPDU according to an embodiment of the present invention.

A specific operation of placing a particular frame in the carried frame is as follows: The RA of the frame is placed in A1, the TA of the frame is placed in A2, the frame control of the frame is placed in the carried frame control field in the encapsulation format, and all parts following the TA of the frame are placed in the carried frame. That is, a termination location indicated by the carried frame length is a location of the end of an FCS of the frame. A time required for sending the following padding and FCS2 is a time that is given to the receive end in the encapsulation format and that is used for reaction made by the receive end. A specific length of the padding and FCS2 is affected by an L-length or an MPDU length or another value related to the PPDU length. For example, after the trigger frame is placed in the format, the frame structure appears as a frame structure shown in FIG. 8.

Figure 8A:
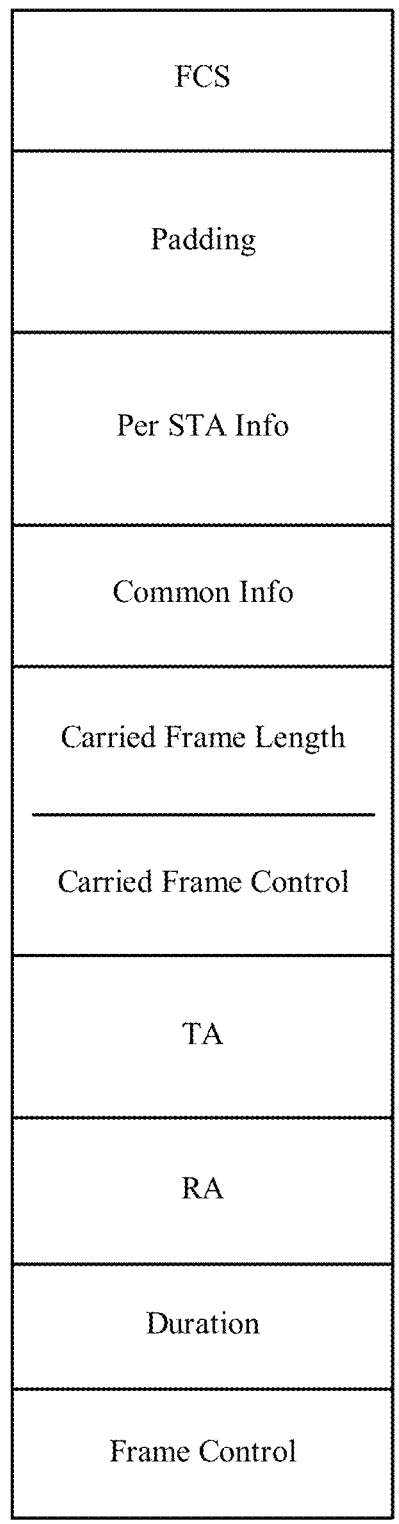
FIG. 8a is a schematic structural diagram of another general PPDU according to an embodiment of the present invention.

It should be noted that if the trigger frame includes only one FCS, after the trigger frame shown in FIG. 3 is placed in the carried frame, a frame structure shown in FIG. 8a is obtained. A specific operation is as follows: The RA of the frame is placed in A1, the TA of the frame is placed in A2, the frame control of the frame is placed in the carried frame control field in the encapsulation format, and all parts between the TA and the FCS of the frame are placed in the carried frame. That is, a termination location indicated by the carried frame length is a location of the end of a per station trigger information (Per STA Info) field of the frame. A time required for sending the following padding and FCS is a time that is given to the receive end in the encapsulation format and that is used for reaction made by the receive end. A specific length of the padding and FCS is affected by an L-length or an MPDU length or another value related to the PPDU length.

In this embodiment, in the padding wrapper format, a carried frame control field is added to a trigger frame indication field having a packet extension function, and the format may be applicable to any PPDU that does not support packet extension at a physical layer, such as a legacy PPDU, an HT PPDU, and a VHT PPDU. In addition, in addition to carrying the trigger frame, the padding wrapper format may further carry another frame. All frames that require a packet extension function can be placed in the carried frame field in the padding wrapper format.

In addition, both A1 and A2 may exist, or A1 or A2 may exist, for example, only A2 exists and A1 does not exist. Specifically, some information bits in the frame control may indicate whether a current frame has A1 and A2. Alternatively, it may be directly stipulated that only A1 or only A2 exists or both A1 and A2 exist in the format.

The receiving station STA receives the trigger frame carried in the padding wrapper format, reads the carried frame control field in the padding wrapper format to learn that the carried frame is the trigger frame, and further reads the carried frame length field to learn an effective trigger length of the trigger frame.

S101. The access point sends the PPDU.

In this embodiment of the present invention, the AP sends the PPDU that carries the trigger frame. Optionally, if the PPDU is the HE PPDU, the HE PPDU may be an SU PPDU or an MU PPDU. If the HE PPDU is the MU PPDU, the trigger frame may be located in one or more sub-channels.

For the MU PPDU, as a receive end, the STA learns, when reading HE-SIG-B of the MU PPDU, that a frame carried in a sub-channel is a broadcast frame, and if it is determined that the STA is not used as a destination STA in the sub-channels, the STA may read the broadcast frame.

Regardless of whether the HE PPDU is the SU PPDU or the MU PPDU, the STA can determine whether the broadcast frame is the trigger frame by further reading a frame control (Frame Control) field of the broadcast frame.

In this embodiment of the present invention, the access point generates the PPDU of the target type, where the PPDU includes the target MAC frame structure that is generated in the target encapsulation format and that carries the trigger frame, and whether the target MAC frame structure includes the packet extension field is determined based on the target type and the target encapsulation format. In this embodiment, whether the target MAC frame structure includes the packet extension field is determined based on the target type of the PPDU and the target encapsulation format of the target MAC frame structure that carries the trigger frame, so as to adapt to various versions of PPDUs.

Figure 9:
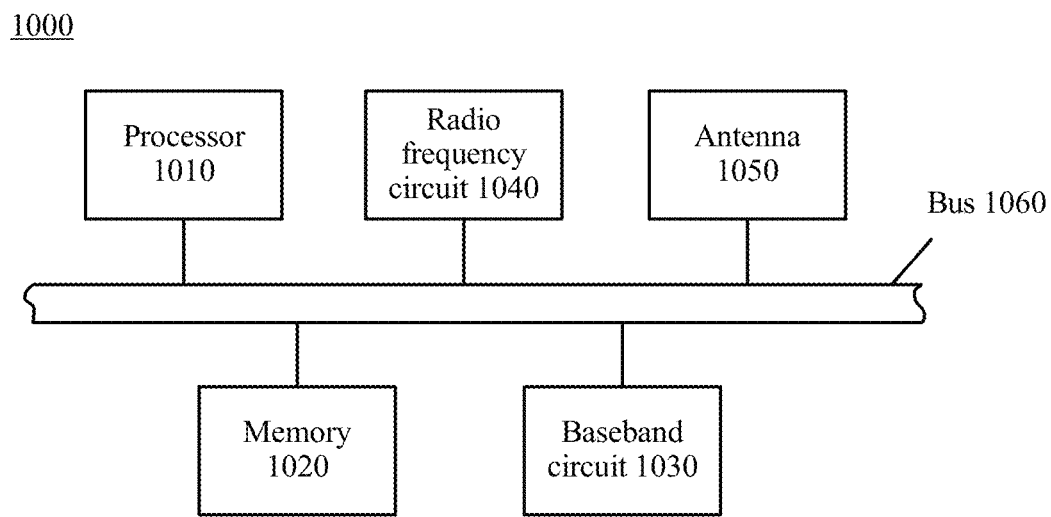
FIG. 9 is a schematic structural diagram of an entity apparatus according to an embodiment of the present invention.

Referring to FIG. 9, FIG. 9 is a schematic block diagram of a frame transmission apparatus in a wireless local area network according to an embodiment of the present invention. The apparatus is, for example, an access point, or a dedicated circuit or a chip implementing a related function. The access point 1000 includes a processor 1010, a memory 1020, a baseband circuit 1030, a radio frequency circuit 1040, and an antenna 1050. The frame transmission apparatus may be the AP shown in FIG. 1. The AP communicates with a STA 1, a STA 2, and a STA 3.

Specifically, the processor 1010 controls an operation of the access point 1000. The memory 1020 may include a read-only memory and a random access memory, and provide an instruction and data for the processor 1010. The processor may be a general-purpose processor, a digital signal processor, an application-specific integrated circuit, a field programmable gate array, or another programmable logic device. A part of the memory 1020 may further include a nonvolatile random access memory (NVRAM). The baseband circuit 1030 is configured to synthesize to-be-transmitted baseband signals, or decode received baseband signals. The radio frequency circuit 1040 is configured to modulate a low-frequency baseband signal to a high-frequency carrier signal, and the high-frequency carrier signal is transmitted by using the antenna 1050. The radio frequency circuit is also configured to demodulate a high-frequency signal received by the antenna 1050 to a low-frequency carrier signal. The components of the access point 1000 are coupled together by using a bus 1060. In addition to a data bus, the bus system 1060 includes a power bus, a control bus, and a status signal bus. However, for clear description, various types of buses in the figure are marked as the bus system 1060. It should be noted that the foregoing descriptions of the access point structure may be applied to subsequent embodiments.

The baseband circuit 1030 is configured to generate a physical layer protocol data unit PPDU of a target type, where the PPDU includes a target media access control MAC frame structure that is generated in a target encapsulation format and that carries a trigger frame, and whether the target MAC frame structure includes a packet extension field is determined based on the target type and the target encapsulation format.

The radio frequency circuit 1040 is configured to send the PPDU.

Optionally, if the target type is a high efficiency HE PPDU, and the target encapsulation format is an AMPDU, the target MAC frame structure does not include the packet extension field; and the PPDU includes indication information that is used to indicate that the target MAC frame structure does not include the packet extension field, where the indication information includes a first termination location indicated by an effective trigger length field of the trigger frame and a second termination location indicated by an MPDU delimiter of the AMPDU, and the first termination location is the same as the second termination location.

Optionally, the packet extension field includes at least one of a padding field or an FCS2 field.

If the target type is an HE PPDU, and the target encapsulation format is an MPDU, whether the target MAC frame structure includes the packet extension field is determined based on the HE PPDU type, the MPDU encapsulation format, and whether an effective length of the target MAC frame structure satisfies a preset condition, where the preset condition is that a termination location of the effective length of the target MAC frame structure is before a termination location of a length of the PPDU; and if the effective length of the target MAC frame structure satisfies the preset condition, the target MAC frame structure includes the packet extension field; or if the effective length of the target MAC frame structure does not satisfy the preset condition, the target MAC frame structure does not include the packet extension field.

Based on the foregoing implementations, in an optional implementation, if the target MAC frame structure includes the packet extension field, the PPDU includes indication information that is used to indicate that the target MAC frame structure includes the packet extension field, where the indication information includes a third termination location indicated by an effective length field of the trigger frame and a fourth termination location indicated by a length field of the PPDU, and a byte difference between the fourth termination location and the third termination location is greater than a preset threshold; or if the target MAC frame structure does not include the packet extension field, the PPDU includes indication information that is used to indicate that the target MAC frame structure does not include the packet extension field, where the indication information includes a fifth termination location indicated by an effective length field of the trigger frame and a sixth termination location indicated by a length field of the PPDU, and a byte difference between the sixth termination location and the fifth termination location is less than or equal to a preset threshold.

In another optional implementation, if the target MAC frame structure includes the packet extension field, the PPDU includes indication information that is used to indicate that the target MAC frame structure includes the packet extension field, where the indication information includes a length value that is encapsulated in an effective length field of the trigger frame and that falls within a preset range; or if the target MAC frame structure does not include the packet extension field, the PPDU includes indication information that is used to indicate that the target MAC frame structure does not include the packet extension field, where the indication information includes a length value that is encapsulated in an effective length field of the trigger frame and that exceeds a preset range.

Optionally, if the target type is a very high throughput VHT PPDU, and the target encapsulation format is an AMPDU, the target MAC frame structure includes the packet extension field; and the PPDU includes indication information that is used to indicate that the target MAC frame structure includes the packet extension field, where the indication information includes a seventh termination location indicated by an effective trigger length field of the trigger frame and an eighth termination location indicated by an MPDU delimiter of the AMPDU, and the seventh termination location is different from the eighth termination location.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

A sequence of the steps of the method in the embodiments of the present invention may be adjusted, and certain steps may also be merged or removed based on an actual need.

The circuits in the terminal in the embodiments of the present invention may be combined, divided, or deleted based on an actual requirement.

The component such as the processor in the embodiments of the present invention may be implemented by a universal integrated circuit, such as a central processing unit (Central Processing Unit, CPU), or by an application-specific integrated circuit (Application-Specific Integrated Circuit, ASIC).

What is claimed is:

1. A frame transmission method in a wireless local area network, comprising:
   generating, by an access point, a physical layer protocol data unit (PPDU) of a target type, wherein the PPDU comprises a target media access control (MAC) frame structure that is generated in a target encapsulation format and that carries a trigger frame, and whether the target MAC frame structure comprises a packet extension field is determined based on the target type and the target encapsulation format, and wherein the packet extension field comprises at least one of a padding field or a second frame check sequence (FCS2) field, and
   when the target type is an high efficiency (HE) PPDU, and the target encapsulation format is a delimiter media access control layer protocol data unit (MPDU):
      whether the target MAC frame structure comprises the packet extension field is determined based on the target type being an HE PPDU, the target encapsulation format being an MPDU, and whether an effective length of the target MAC frame structure satisfies a preset condition, wherein the preset condition is that a termination location of the effective length of the target MAC frame structure is before a termination location of a length of the PPDU; and
      when the effective length of the target MAC frame structure satisfies the preset condition, the target MAC frame structure comprises the packet extension field; or
      when the effective length of the target MAC frame structure does not satisfy the preset condition, the target MAC frame structure does not comprise the packet extension field; and
   sending, by the access point, the PPDU.

2. The method according to claim 1, wherein
when the target type is a high efficiency (HE) PPDU, and the target encapsulation format is an aggregated media access control layer protocol data unit (AMPDU):
   the target MAC frame structure does not comprise the packet extension field; and
   the PPDU comprises indication information indicating that the target MAC frame structure does not comprise the packet extension field, wherein the indication information comprises a first termination location indicated by an effective trigger length field of the trigger frame and a second termination location indicated by a delimiter media access control layer protocol data unit (MPDU) of the AMPDU, and the first termination location is the same as the second termination location.

3. The method according to claim 1, wherein
when the target MAC frame structure comprises the packet extension field, the PPDU comprises indication information indicating that the target MAC frame structure comprises the packet extension field, wherein the indication information comprises a third termination location indicated by an effective length field of the trigger frame and a fourth termination location indicated by a length field of the PPDU, and a byte difference between the fourth termination location and the third termination location is greater than a preset threshold; or
when the target MAC frame structure does not comprise the packet extension field, the PPDU comprises indication information indicating that the target MAC frame structure does not comprise the packet extension field, wherein the indication information comprises a fifth termination location indicated by an effective length field of the trigger frame and a sixth termination location indicated by a length field of the PPDU, and a byte difference between the sixth termination location and the fifth termination location is less than or equal to a preset threshold.

4. The method according to claim 1, wherein
when the target MAC frame structure comprises the packet extension field, the PPDU comprises indication information indicating that the target MAC frame structure comprises the packet extension field, wherein the indication information comprises a length value that is encapsulated in an effective length field of the trigger frame and that falls within a preset range; or
when the target MAC frame structure does not comprise the packet extension field, the PPDU comprises indication information indicating that the target MAC frame structure does not comprise the packet extension field, wherein the indication information comprises a length value that is encapsulated in an effective length field of the trigger frame and that exceeds a preset range.

5. The method according to claim 1, wherein
when the target type is a very high throughput (VHT) PPDU, and the target encapsulation format is an AMPDU:
   the target MAC frame structure comprises the packet extension field; and
   the PPDU comprises indication information indicating that the target MAC frame structure comprises the packet extension field, wherein the indication information comprises a seventh termination location indicated by an effective trigger length field of the trigger frame and an eighth termination location indicated by an MPDU delimiter of the AMPDU, and the seventh termination location is different from the eighth termination location.

6. A frame transmission apparatus in a wireless local area network, comprising:
a baseband circuit, configured to generate a physical layer protocol data unit (PPDU) of a target type, wherein the PPDU comprises a target media access control (MAC) frame structure that is generated in a target encapsulation format and that carries a trigger frame, and whether the target MAC frame structure comprises a packet extension field is determined based on the target type and the target encapsulation format, and wherein the packet extension field comprises at least one of a padding field or a second frame check sequence (FCS2) field, and when the target type is an high efficiency (HE) PPDU, and the target encapsulation format is an MPDU:
whether the target MAC frame structure comprises the packet extension field is determined based on the target type being an HE PPDU, the target encapsulation format being an MPDU, and whether an effective length of the target MAC frame structure satisfies a preset condition, wherein the preset condition is that a termination location of the effective length of the target MAC frame structure is before a termination location of a length of the PPDU; and when the effective length of the target MAC frame structure satisfies the preset condition, the target MAC frame structure comprises the packet extension field; or when the effective length of the target MAC frame structure does not satisfy the preset condition, the target MAC frame structure does not comprise the packet extension field; and a radio frequency circuit communicatively coupled with the baseband circuit, configured to send the PPDU.

7. The apparatus according to claim 6, wherein
when the target type is a high efficiency (HE) PPDU, and the target encapsulation format is an aggregated media access control layer protocol data unit (AMPDU):
the target MAC frame structure does not comprise the packet extension field; and
the PPDU comprises indication information indicating that the target MAC frame structure does not comprise the packet extension field, wherein the indication information comprises a first termination location indicated by an effective trigger length field of the trigger frame and a second termination location indicated by an MPDU delimiter of the AMPDU, and the first termination location is the same as the second termination location.

8. The apparatus according to claim 6, wherein
when the target MAC frame structure comprises the packet extension field, the PPDU comprises indication information indicating that the target MAC frame structure comprises the packet extension field, wherein the indication information comprises a third termination location indicated by an effective length field of the trigger frame and a fourth termination location indicated by a length field of the PPDU, and a byte difference between the fourth termination location and the third termination location is greater than a preset threshold; or when the target MAC frame structure does not comprise the packet extension field, the PPDU comprises indication information indicating that the target MAC frame structure does not comprise the packet extension field, wherein the indication information comprises a fifth termination location indicated by an effective length field of the trigger frame and a sixth termination location indicated by a length field of the PPDU, and a byte difference between the sixth termination location and the fifth termination location is less than or equal to a preset threshold.

9. The apparatus according to claim 6, wherein
when the target MAC frame structure comprises the packet extension field, the PPDU comprises indication information indicating that the target MAC frame structure comprises the packet extension field, wherein the indication information comprises a length value that is encapsulated in an effective length field of the trigger frame and that falls within a preset range; or when the target MAC frame structure does not comprise the packet extension field, the PPDU comprises indication information indicating that the target MAC frame structure does not comprise the packet extension field, wherein the indication information comprises a length value that is encapsulated in an effective length field of the trigger frame and that exceeds a preset range.

10. The apparatus according to claim 6, wherein
when the target type is a very high throughput (VHT) PPDU, and the target encapsulation format is an AMPDU:
the target MAC frame structure comprises the packet extension field; and
the PPDU comprises indication information indicating that the target MAC frame structure comprises the packet extension field, wherein the indication information comprises a seventh termination location indicated by an effective trigger length field of the trigger frame and an eighth termination location indicated by an MPDU delimiter of the AMPDU, and the seventh termination location is different from the eighth termination location.

* * * * *